US012574535B2

(12) United States Patent
Ma

(10) Patent No.: US 12,574,535 B2
(45) Date of Patent: Mar. 10, 2026

(54) METHOD, APPARATUS, STORAGE MEDIA AND PROGRAM PRODUCT FOR VIDEO DECODING

(71) Applicant: BEIJING ZITIAO NETWORK TECHNOLOGY CO., LTD., Beijing (CN)

(72) Inventor: Chao Ma, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 18/567,933

(22) PCT Filed: Jul. 26, 2022

(86) PCT No.: PCT/CN2022/108030
§ 371 (c)(1),
(2) Date: Dec. 7, 2023

(87) PCT Pub. No.: WO2023/024801
PCT Pub. Date: Mar. 2, 2023

(65) Prior Publication Data
US 2024/0275997 A1 Aug. 15, 2024

(30) Foreign Application Priority Data
Aug. 23, 2021 (CN) ......................... 202110967129.X

(51) Int. Cl.
*H04N 19/42* (2014.01)
*G11B 20/00* (2006.01)
(Continued)

(52) U.S. Cl.
CPC ....... *H04N 19/42* (2014.11); *G11B 20/00007* (2013.01); *G11B 2020/00072* (2013.01)

(58) Field of Classification Search
CPC ........ H04N 19/42; H04N 19/46; H04N 19/44; H04N 19/50
(Continued)

(56) References Cited

U.S. PATENT DOCUMENTS

2002/0186769 A1* 12/2002 O'Brien ................. H04N 19/40
348/E5.111
2022/0365959 A1* 11/2022 He ........................... G06F 16/41

FOREIGN PATENT DOCUMENTS

CN 101064824 A 10/2007
CN 104602115 A 5/2015
(Continued)

OTHER PUBLICATIONS

International Search Report (with English translation) and Written Opinion issued in PCT/CN2022/108030, dated Oct. 17, 2022, 10 pages provided.
(Continued)

*Primary Examiner* — Daquan Zhao
(74) *Attorney, Agent, or Firm* — Astute IP Law Group

(57) ABSTRACT

Embodiments of the present disclosure provide a method, an apparatus, an electronic device, a computer-readable storage medium, a computer program product, and a computer program for video decoding. The method obtains playback address information of a video to be played, the playback address information carrying encoding format information of the video to be played; obtains the video to be played in accordance with the playback address information; and, in progress of obtaining the video to be played asynchronously, acquires a hardware decoder based on the encoding format information of the video to be played; and decodes the obtained video to be played with the hardware decoder. Embodiments of the present disclosure carry the encoding format information of the video to be played in the playback address information of the video, so that the asynchronous
(Continued)

acquisition of the hardware decoder can be adopted in progress of the startup of video playback.

20 Claims, 4 Drawing Sheets

(51) Int. Cl.
*H04N 19/46* (2014.01)
*H04N 19/50* (2014.01)

(58) Field of Classification Search
USPC ................. 386/353, 354, 355, 356, 200, 211
See application file for complete search history.

(56) References Cited

FOREIGN PATENT DOCUMENTS

| | | | |
|---|---|---|---|
| CN | 104768051 | A | 7/2015 |
| CN | 106878290 | A | 6/2017 |
| CN | 107529069 | A | 12/2017 |
| CN | 109862409 | A | 6/2019 |
| CN | 110401866 | A | 11/2019 |
| CN | 113225605 | A | 2/2020 |
| CN | 110858827 | A | 3/2020 |
| CN | 111372128 | A | 7/2020 |
| CN | 111479164 | A | 7/2020 |
| CN | 111479165 | A | 7/2020 |
| CN | 111757120 | A | 10/2020 |
| CN | 113676769 | A | 11/2021 |
| EP | 1411439 | A2 | 4/2004 |
| WO | 2000016544 | A2 | 3/2000 |
| WO | 2021087843 | A1 | 5/2021 |

OTHER PUBLICATIONS

Chinese Office Action, issued in Chinese patent application No. 202110967129.X, dated Aug. 5, 2023, 14 pages (translation enclosed).
Extreme first frame playback scheme-zero first frame solution background introduction, ByteDance Video Cloud Technology Team, Read 2378 on Feb. 11, 2021, 14 pages.
Notification to Grant Patent Right for Invention for Chinese Patent Application No. 202110967129.X, mailed on Feb. 23, 2023, 7 pages.

* cited by examiner

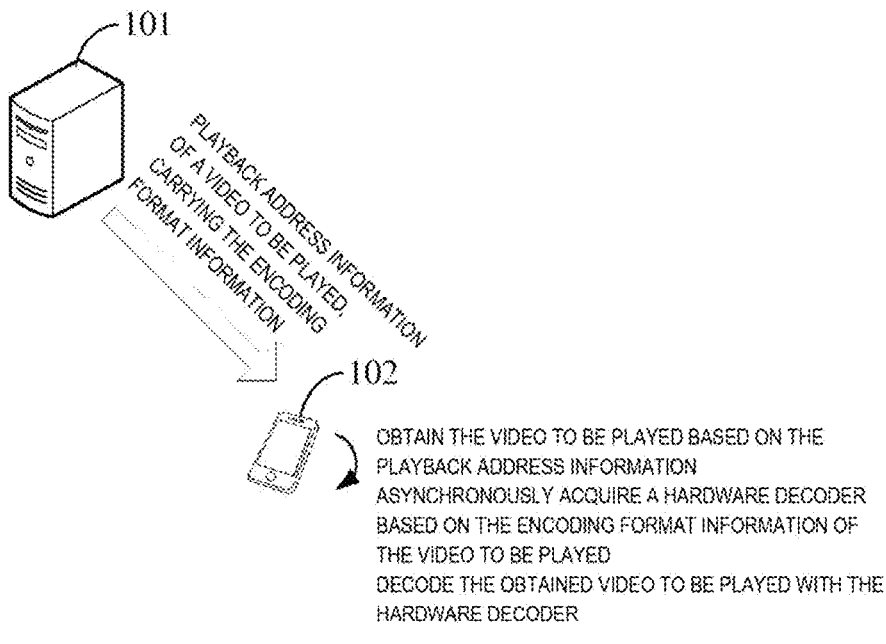

PLAYBACK ADDRESS INFORMATION OF A VIDEO TO BE PLAYED, CARRYING THE ENCODING FORMAT INFORMATION

OBTAIN THE VIDEO TO BE PLAYED BASED ON THE PLAYBACK ADDRESS INFORMATION
ASYNCHRONOUSLY ACQUIRE A HARDWARE DECODER BASED ON THE ENCODING FORMAT INFORMATION OF THE VIDEO TO BE PLAYED
DECODE THE OBTAINED VIDEO TO BE PLAYED WITH THE HARDWARE DECODER

Fig.1

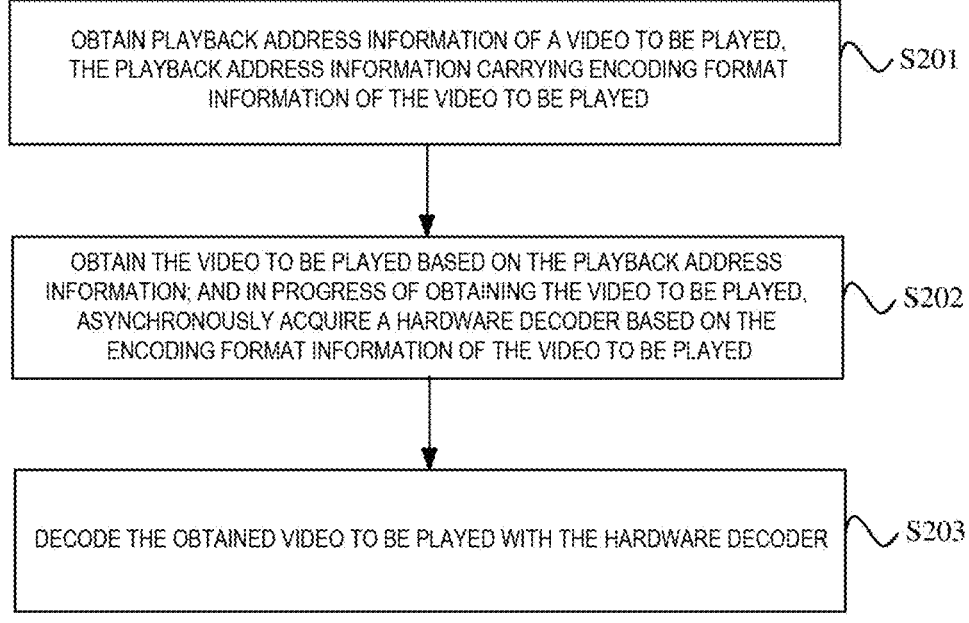

OBTAIN PLAYBACK ADDRESS INFORMATION OF A VIDEO TO BE PLAYED, THE PLAYBACK ADDRESS INFORMATION CARRYING ENCODING FORMAT INFORMATION OF THE VIDEO TO BE PLAYED — S201

OBTAIN THE VIDEO TO BE PLAYED BASED ON THE PLAYBACK ADDRESS INFORMATION; AND IN PROGRESS OF OBTAINING THE VIDEO TO BE PLAYED, ASYNCHRONOUSLY ACQUIRE A HARDWARE DECODER BASED ON THE ENCODING FORMAT INFORMATION OF THE VIDEO TO BE PLAYED — S202

DECODE THE OBTAINED VIDEO TO BE PLAYED WITH THE HARDWARE DECODER — S203

Fig.2

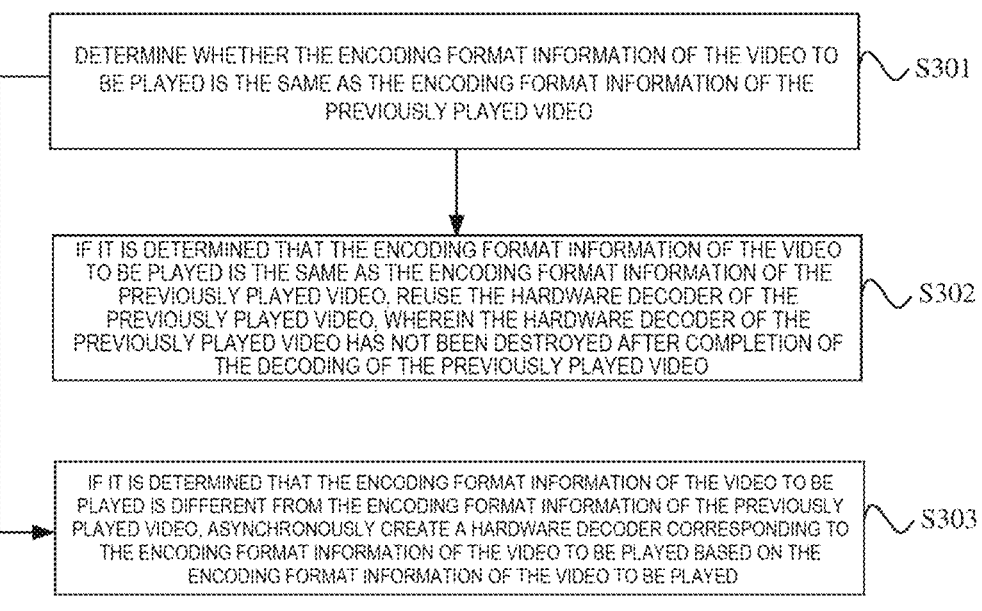

DETERMINE WHETHER THE ENCODING FORMAT INFORMATION OF THE VIDEO TO BE PLAYED IS THE SAME AS THE ENCODING FORMAT INFORMATION OF THE PREVIOUSLY PLAYED VIDEO — S301

IF IT IS DETERMINED THAT THE ENCODING FORMAT INFORMATION OF THE VIDEO TO BE PLAYED IS THE SAME AS THE ENCODING FORMAT INFORMATION OF THE PREVIOUSLY PLAYED VIDEO, REUSE THE HARDWARE DECODER OF THE PREVIOUSLY PLAYED VIDEO, WHEREIN THE HARDWARE DECODER OF THE PREVIOUSLY PLAYED VIDEO HAS NOT BEEN DESTROYED AFTER COMPLETION OF THE DECODING OF THE PREVIOUSLY PLAYED VIDEO — S302

IF IT IS DETERMINED THAT THE ENCODING FORMAT INFORMATION OF THE VIDEO TO BE PLAYED IS DIFFERENT FROM THE ENCODING FORMAT INFORMATION OF THE PREVIOUSLY PLAYED VIDEO, ASYNCHRONOUSLY CREATE A HARDWARE DECODER CORRESPONDING TO THE ENCODING FORMAT INFORMATION OF THE VIDEO TO BE PLAYED BASED ON THE ENCODING FORMAT INFORMATION OF THE VIDEO TO BE PLAYED — S303

Fig.3

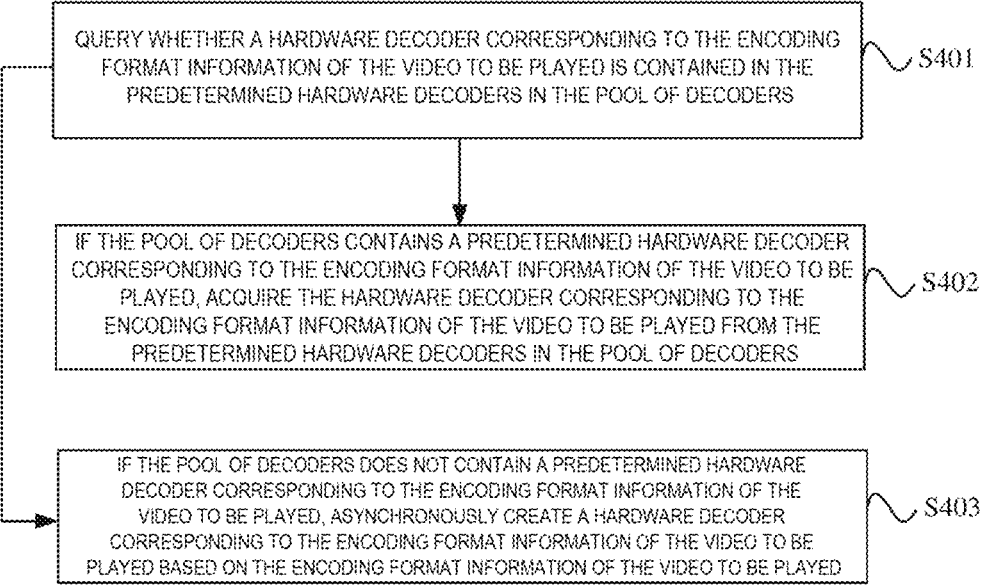

QUERY WHETHER A HARDWARE DECODER CORRESPONDING TO THE ENCODING FORMAT INFORMATION OF THE VIDEO TO BE PLAYED IS CONTAINED IN THE PREDETERMINED HARDWARE DECODERS IN THE POOL OF DECODERS — S401

IF THE POOL OF DECODERS CONTAINS A PREDETERMINED HARDWARE DECODER CORRESPONDING TO THE ENCODING FORMAT INFORMATION OF THE VIDEO TO BE PLAYED, ACQUIRE THE HARDWARE DECODER CORRESPONDING TO THE ENCODING FORMAT INFORMATION OF THE VIDEO TO BE PLAYED FROM THE PREDETERMINED HARDWARE DECODERS IN THE POOL OF DECODERS — S402

IF THE POOL OF DECODERS DOES NOT CONTAIN A PREDETERMINED HARDWARE DECODER CORRESPONDING TO THE ENCODING FORMAT INFORMATION OF THE VIDEO TO BE PLAYED, ASYNCHRONOUSLY CREATE A HARDWARE DECODER CORRESPONDING TO THE ENCODING FORMAT INFORMATION OF THE VIDEO TO BE PLAYED BASED ON THE ENCODING FORMAT INFORMATION OF THE VIDEO TO BE PLAYED — S403

Fig.4

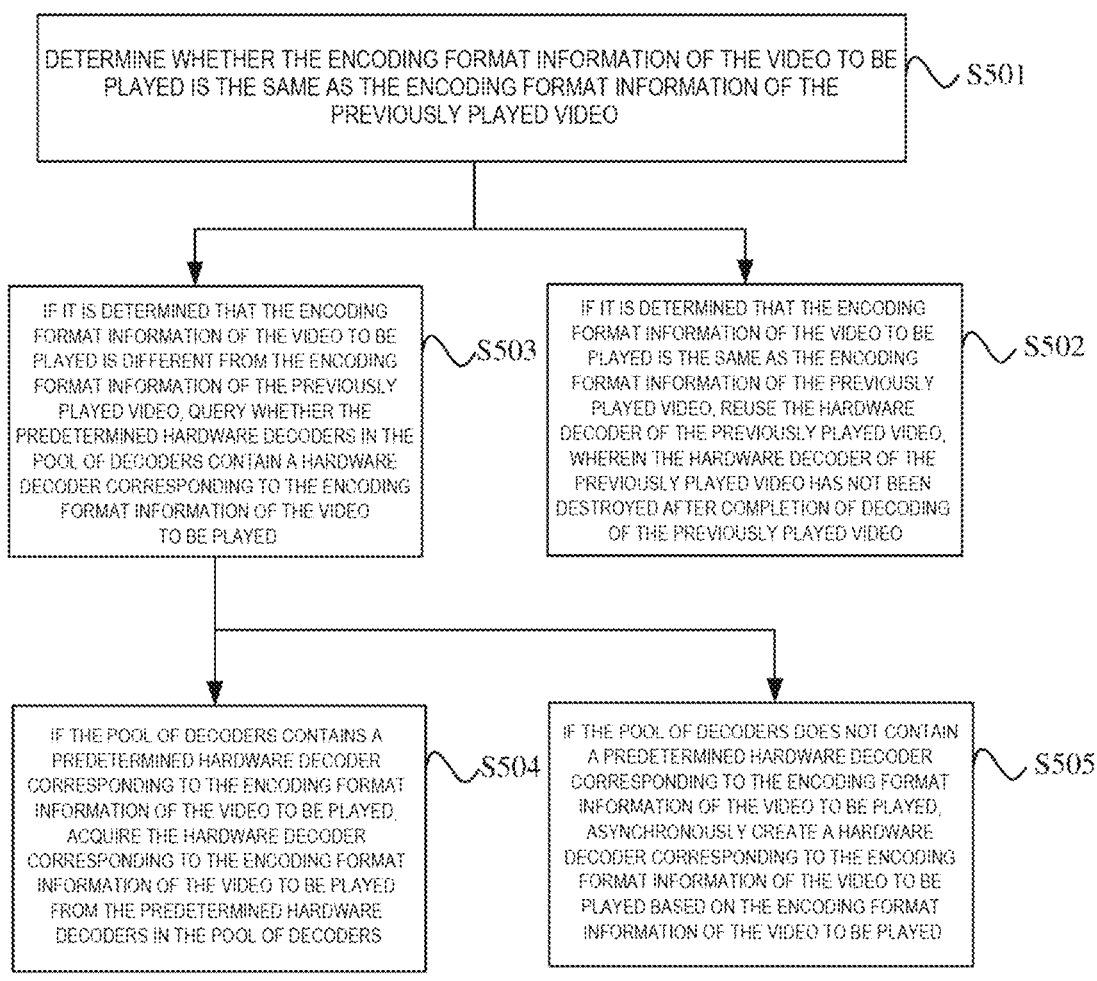

DETERMINE WHETHER THE ENCODING FORMAT INFORMATION OF THE VIDEO TO BE PLAYED IS THE SAME AS THE ENCODING FORMAT INFORMATION OF THE PREVIOUSLY PLAYED VIDEO ~ S501

IF IT IS DETERMINED THAT THE ENCODING FORMAT INFORMATION OF THE VIDEO TO BE PLAYED IS DIFFERENT FROM THE ENCODING FORMAT INFORMATION OF THE PREVIOUSLY PLAYED VIDEO, QUERY WHETHER THE PREDETERMINED HARDWARE DECODERS IN THE POOL OF DECODERS CONTAIN A HARDWARE DECODER CORRESPONDING TO THE ENCODING FORMAT INFORMATION OF THE VIDEO TO BE PLAYED ~ S503

IF IT IS DETERMINED THAT THE ENCODING FORMAT INFORMATION OF THE VIDEO TO BE PLAYED IS THE SAME AS THE ENCODING FORMAT INFORMATION OF THE PREVIOUSLY PLAYED VIDEO, REUSE THE HARDWARE DECODER OF THE PREVIOUSLY PLAYED VIDEO, WHEREIN THE HARDWARE DECODER OF THE PREVIOUSLY PLAYED VIDEO HAS NOT BEEN DESTROYED AFTER COMPLETION OF DECODING OF THE PREVIOUSLY PLAYED VIDEO ~ S502

IF THE POOL OF DECODERS CONTAINS A PREDETERMINED HARDWARE DECODER CORRESPONDING TO THE ENCODING FORMAT INFORMATION OF THE VIDEO TO BE PLAYED, ACQUIRE THE HARDWARE DECODER CORRESPONDING TO THE ENCODING FORMAT INFORMATION OF THE VIDEO TO BE PLAYED FROM THE PREDETERMINED HARDWARE DECODERS IN THE POOL OF DECODERS ~ S504

IF THE POOL OF DECODERS DOES NOT CONTAIN A PREDETERMINED HARDWARE DECODER CORRESPONDING TO THE ENCODING FORMAT INFORMATION OF THE VIDEO TO BE PLAYED, ASYNCHRONOUSLY CREATE A HARDWARE DECODER CORRESPONDING TO THE ENCODING FORMAT INFORMATION OF THE VIDEO TO BE PLAYED BASED ON THE ENCODING FORMAT INFORMATION OF THE VIDEO TO BE PLAYED ~ S505

Fig.5

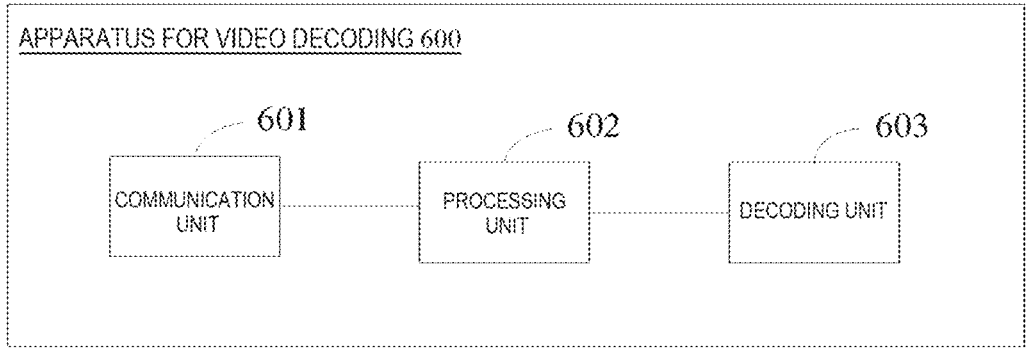

APPARATUS FOR VIDEO DECODING 600

601

602

603

COMMUNICATION UNIT

PROCESSING UNIT

DECODING UNIT

Fig.6

METHOD, APPARATUS, STORAGE MEDIA AND PROGRAM PRODUCT FOR VIDEO DECODING

CROSS-REFERENCE

This disclosure claims priority to Chinese patent application No. 202110967129.X, filed on Aug. 23, 2021, entitled "METHOD, APPARATUS, STORAGE MEDIA AND PROGRAM PRODUCTS FOR VIDEO DECODING", the entire contents of which are incorporated herein by reference.

FIELD

Embodiments of the present disclosure relate to the technical field of video processing, and in particular, to method, an apparatus, an electronic device, a computer-readable storage medium, a computer program product and a computer program for a video decoding.

BACKGROUND

"Time to first frame" refers to the time from when a user clicks to start playback to when the first frame of the video is displayed, which is an important indicator of video-based applications and one of the core factors affecting the user's viewing experience, so optimizing the time to first frame of video decoding is extremely important.

The video decoding method in the existing technology, in the player needs to play a video, to start a new player, the player needs to read the video data after the start of the broadcast, get the video decoding information to create a decoder, and then the first frame decoding, decoding after video rendering can be played.

In conventional approaches for video decoding, the time to first frame is relatively long, usually 200 ms, and the first frame may be delayed or lagged when the user switches the video, which seriously affects the user experience.

SUMMARY

Embodiments of the present disclosure provide a method, an apparatus, an electronic device, a computer-readable storage medium, a computer program product and a computer program for video decoding, in order to reduce the time to first frame of the video to avoid negative impact on the user experience.

In a first aspect, embodiments of the present disclosure provide a method of video decoding comprising:

obtaining playback address information of a video to be played, the playback address information carrying encoding format information of the video to be played;

obtaining the video to be played based on the playback address information, and in progress of obtaining the video to be played, asynchronously acquiring a hardware decoder based on the encoding format information of the video to be played; and decoding the obtained video to be played with the hardware decoder.

In a second aspect, embodiments of the present disclosure provide an apparatus for video decoding comprising:

a communication unit configured for obtaining playback address information of a video to be played, the playback address information carrying encoding format information of the video to be played;

a processing unit configured for obtaining the video to be played based on the playback address information, and for, in progress of obtaining the video to be played, asynchronously acquiring a hardware decoder based on the encoding format information of the video to be played; and a decoding unit for decoding the obtained video to be played with the hardware decoder.

In a third aspect, embodiments of the present disclosure provide electronic device comprising at least one processor and a memory;

the memory storing computer executable instructions;

the at least one processor executing the computer executable instructions stored in the memory to cause the at least one processor to implement the method of video decoding as described in the above first aspect and various possible designs thereof.

In a fourth aspect, embodiments of the present disclosure provide a computer-readable storage medium storing computer-executable instructions which, when executed by a processor, causes the processor to implement the method of video decoding as described in the above first aspect and various possible designs thereof.

In a fifth aspect, embodiments of the present disclosure provide a computer program product comprising computer-executable instructions which, when executed by a processor, causes the processor to implement the method of video decoding as described in the above first aspect and various possible designs thereof.

In a sixth aspect, embodiments of the present disclosure provide a computer program, when executed by a processor, implement the method of video decoding as described in the above first aspect and various possible designs thereof.

Embodiments of the present disclosure provide a method, an apparatus, an electronic device, a computer-readable storage medium, a computer program product, and a computer program of video decoding. The method obtains playback address information of a video to be played, the playback address information carrying encoding format information of the video to be played; obtains the video to be played in accordance with the playback address information; and, in progress of obtaining the video to be played, obtains the video to be played based on the encoding format information of the video to be played and asynchronously acquires a hardware decoder; and decodes the obtained video to be played with the hardware decoder. Embodiments of the present disclosure carry the encoding format information of the video to be played in the playback address information of the video to be played, and thus are able to asynchronously acquire the hardware decoder during startup of playback. In this way, the time consumed in creating the hardware decoder is saved, thereby reducing the time to first frame, avoiding the delay or lag of the first frame, and enhancing the viewing experience of the user.

BRIEF DESCRIPTION OF THE DRAWINGS

In order to more clearly illustrate the technical solutions in the embodiments or prior art of the present disclosure, the following will briefly introduce the accompanying drawings that need to be used in the description of the embodiments or prior art, and it is obvious that the accompanying drawings in the following description are some of the embodiments of the present disclosure, and for the person of ordinary skill in the field, other accompanying drawings can be obtained based on these drawings without paying creative labor.

FIG. 1 shows a schematic diagram of an application scenario of a video decoding method provided in an embodiment of the present disclosure;

FIG. 2 shows a schematic flow diagram of a video decoding method provided by an embodiment of the present disclosure;

FIG. 3 shows a flow diagram of a video decoding method provided by another embodiment of the present disclosure;

FIG. 4 shows a flowchart of a video decoding method provided by another embodiment of the present disclosure;

FIG. 5 shows a flowchart of a video decoding method provided by another embodiment of the present disclosure;

FIG. 6 shows a block diagram of a video decoding apparatus provided in an embodiment of the present disclosure.

DETAILED DESCRIPTION

Figure 7:
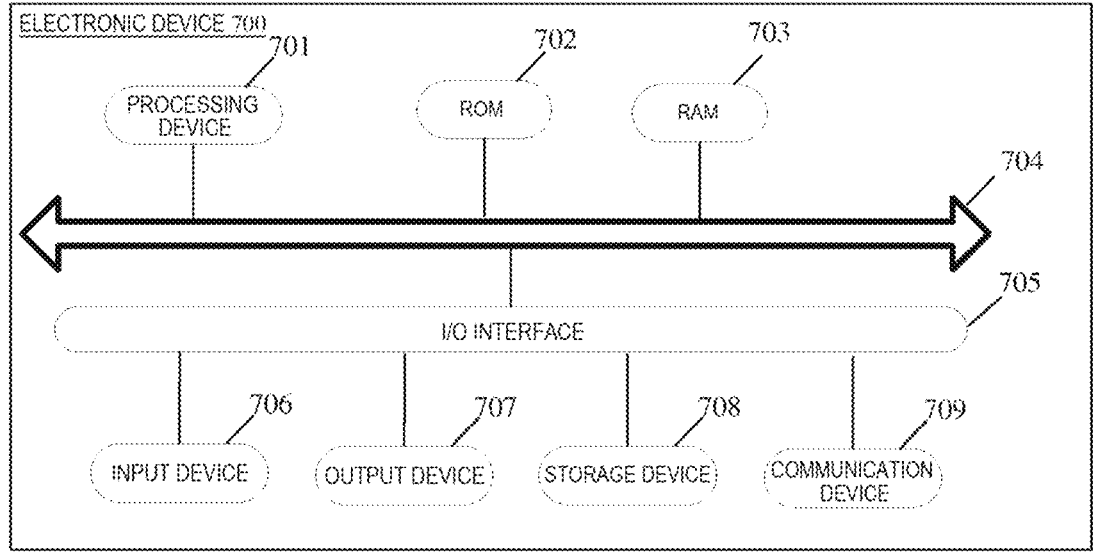
FIG. 7 shows a schematic diagram of hardware of an electronic device provided in an embodiment of the present disclosure.

In order to make the objects, technical solutions and advantages of the embodiments of the present disclosure clearer, the technical solutions in the embodiments of the present disclosure will be described clearly and completely in the following in conjunction with the accompanying drawings in the embodiments of the present disclosure, and it is clear that the described embodiments are a part of the embodiments of the present disclosure, and not all of the embodiments. According to embodiments in the present disclosure, all other embodiments obtained by a person of ordinary skill in the art without making creative labor fall within the scope of protection of the present disclosure.

In conventional video decoding, when a player needs to replay a video, a new player is started. The player needs to read the video data after starting the play and creates a decoder after obtaining the decoding information of the video. The first frame is then decoded. Then the decoded video is ready to be played after video rendering. The decoder is a hardware decoder which refers to a video decoder that does not depend on the CPU. The hardware decoder decoding can decode with the Graphics Processing Unit (GPU), and the hardware decoder can be a decoding unit used by the GPU for decoding.

The conventional approaches for video decoding have a long time to first frame, generally 200 ms, wherein 80-160 ms is the time consumed for creating the hardware decoder (hardware decoder initialization) and decoding the first frame, which is time consuming. The first frame may be delayed or lagged when the user switches the video, which seriously affects the user's experience.

In order to solve the above problems, embodiments of the present disclosure adopt asynchronous initialization of the hardware decoder. That is, when sending the playback address information of the video to be played, the server may carry the encoding format information of the video to be played in the playback address information. The video to be played can be obtained based on the playback address information. While obtaining the video to be played, the hardware decoder can be acquired asynchronously based on the encoding format information of the video to be played. In progress of acquiring the video to be played, a hardware decoder is acquired asynchronously based on the encoding format information of the video to be played. After the first frame of the video to be played is obtained, the obtained video to be played is decoded with the hardware decoder. By means of asynchronous initialization of the hardware decoder, the hardware decoder can be the initialized during the startup of playback, reducing the time to first frame and improving the viewing experience of the user.

The video decoding mechanism as provided by embodiments of the present disclosure is applicable to an application scenario as shown in FIG. 1, comprising a server 101 and a terminal device 102. The server 101 may send playback address information of the video to be played to the terminal device 102 and include encoding format information of the video to be played into the playback address information of the video to be played. The terminal device 102 obtains the video to be played based on the playback address information and, in progress of obtaining the video to be played, asynchronously acquires a hardware decoder based on the encoding format information of the video to be played, and then decodes the obtained video to be played with the hardware decoder.

The video decoding method provided by embodiments of the present disclosure will be described in detail below in connection with specific embodiments.

FIG. 2 shows a flow diagram I of the video decoding method provided by embodiments of the present disclosure. The method of the present embodiment can be applied in a terminal device, and the video decoding method comprises:

S201, obtain playback address information of the video to be played, the playback address information carrying encoding format information of the video to be played.

In this embodiment, when a certain video to be played needs to be played, the terminal device may obtain the playback address information of the video to be played, or the server may send the playback address information of the video to be played, such as a Uniform Resource Locator (URL). Within the playback address information of the video to be played, it is filled with the encoding format information (Codec Type) of the video to be played in such as H264, VP9, HEVC, and so on.

Optionally, in the application scenario of feed video streaming, the server may send the playback address information of the video to be played when the Feed video stream is sent.

Optionally, in response to the video switching instruction, the playback address information of the video to be played is obtained based on the video switching instruction. That is, the user may request the playback address information of the next video to be played from the server when switching the video, and the server may push the playback address information of the next video to be played to the terminal device according to the request and carry the encoding format information of the video to be played in the playback address information.

S202, obtain the video to be played based on the playback address information; and in progress of obtaining the video to be played, asynchronously acquiring a hardware decoder based on the encoding format information of the video to be played.

In this embodiment, the video to be played may be obtained after obtaining the playback address information of the video to be played. This is the startup of playback and may include the process of network establishment, video data downloading, and the like.

In the startup of playback, since the encoding format information of the video to be played has been obtained from the broadcasting address information, an asynchronous acquisition of a hardware decoder can be done at the same time, instead of creating a hardware decoder after obtaining the video to be played and parsing the first frame of the video to be played, which saves the time for creating the hardware decoder. The hardware decoder is a CPU-independent video decoding method, which occupies lower system resources and has higher computing performance. For example, it can decode with GPU or other multimedia, video and audio decoding chips, without suggesting any limitation to the scope herein. Different video encoding formats require different hardware decoders. Therefore, a corresponding hardware decoder can be acquired according to the information of the encoding format of the video to be played. The process of acquiring the hardware decoder can be a process of creating the hardware decoder, initializing the hardware decoder, or specifying an existing hardware decoder which is to be used.

S203, decode the obtained video to be played with the hardware decoder.

In this embodiment, after acquiring the hardware decoder and obtaining the video to be played, the video to be played may be decoded with the hardware decoder. Specifically, the compressed coded data of the audio and the video may be decoded to become uncompressed audio and video data, and further the video screen may be rendered, and the audio and the video may be played in synchronization, and the specific process will not be repeated here.

Embodiments of the present disclosure provide a video decoding method which obtains playback address information of a video to be played, the playback address information carrying encoding format information of the video to be played; obtains the video to be played according to the playback address information and asynchronously acquires a hardware decoder based on the encoding format information of the video to be played during the process of obtaining the video to be played. This embodiment carries the encoding format information of the video to be played in the playback address information of the video to be played, and thus can adopt the mechanism of asynchronously acquiring the hardware decoder in progress of startup of video playback. This saves the time consumed in creating the hardware decoder, reduces the time to first frame, avoids the delay or lag of the first frame, and improves the viewing experience of the user.

In an optional embodiment, the asynchronous acquisition of a hardware decoder based on the encoding format information of the video to be played, as described at S202 of the above embodiment, comprises:

asynchronously creating a hardware decoder corresponding to the encoding format information of the video to be played based on the encoding format information of the video to be played.

In this embodiment, after obtaining the encoding format information of the video to be played carried from the playback address information of the video to be played, the hardware decoder corresponding to the encoding format information of the video to be played can be directly created asynchronously, that is, the hardware decoder corresponding to the encoding format information of the video to be played can be initialized, which can optionally comprise the creation of an interface, allocation of a video memory, initialization of a decoding environment, parameter configuration, and so on. The specific processes will not be detailed herein. The direct asynchronous initialization of the hardware encoder in this embodiment can save the time to first frame by 80 ms, which effectively reduces the time to first frame.

In another optional embodiment, as shown in FIG. 3, asynchronously acquiring a hardware decoder based on the encoding format information of the video to be played, as described at S202 of the above embodiment, comprises:

S301, determine whether the encoding format information of the video to be played is the same as the encoding format information of the previously played video.

S302, if it is determined that the encoding format information of the video to be played is the same as the encoding format information of the previously played video, reuse the hardware decoder of the previously played video, wherein the hardware decoder of the previously played video has not been destroyed after completion of the decoding of the previously played video.

In this embodiment, if the encoding format information of the video to be played is the same as the encoding format information of the previously played video, the hardware decoder of the previously played video may be reused.

Conventionally the hardware decoder will be destroyed after the decoding of each video played. That is, the hardware decoder will be released, and the hardware decoder needs to be recreated when the next video is played. For the case where the encoding format information of the two videos is the same, destroying and then recreating the hardware decoder will take up some of the time to first frame. Therefore, the hardware decoder of the previously played video is not destroyed after the decoding of the previously played video is completed. It is determined whether the encoding format information of the current video to be played is the same as the encoding format information of the previously played video. If the encoding format information is the same, the hardware decoder of the previously played video can be directly reused without re-creation of the hardware decoder. Compared to the asynchronous creation of the hardware decoder in the above-described embodiment, more 70 ms can be saved from the time to first frame (including the time for destruction and re-creation).

Further, if it is determined at S301 that the encoding format information of the video to be played is different from the encoding format information of the previously played video, S303 may be performed.

S303, if it is determined that the encoding format information of the video to be played is different from the encoding format information of the previously played video, asynchronously create a hardware decoder corresponding to the encoding format information of the video to be played based on the encoding format information of the video to be played.

In this embodiment, if it is determined that the encoding format information of the video to be played is different from the encoding format information of the previous video that has been played, the hardware decoder of the previous video that has been played cannot be reused. In this case, the hardware decoder corresponding to the encoding format information of the video to be played can be re-created asynchronously, as described in the above embodiment. This ensures that the time to first frame can be reduced by asynchronously initializing the hardware decoder in the case that the hardware decoder of the previously played video cannot be reused. Optionally, the hardware decoder of the previously played video may or may not be destroyed.

In another optional embodiment, the asynchronous acquisition of the hardware decoder based on the encoding format information of the video to be played, as described at S202 of the above embodiment, comprises:

based on the encoding format information of the video to be played, acquiring a hardware decoder corresponding to the encoding format information of the video to be played from predetermined hardware decoders in a pool of decoders.

In this embodiment, it is possible to provide a pool of decoders which is preconfigured with a number of predetermined hardware decoders corresponding to different encoding format information actively configured. Or, alternatively, newly created hardware decoders can be added into the pool of decoders after decoding is completed.

After obtaining the encoding format information of the video to be played from the playback address information of the video to be played, the pool of decoders may be queried based on the encoding format information of the video to be played. If a hardware decoder corresponding to the encoding format information of the video to be played exists in the pool of decoders, this hardware decoder is acquired directly from the pool of decoders.

Further, after the hardware decoder has finished decoding the obtained video to be played, the hardware decoder is re-added to the pool of decoders so that the hardware decoder can be reused for subsequent videos.

Further, as shown in FIG. 4, asynchronously acquiring the hardware decoder based on the encoding format information of the video to be played as described at S202 of the above embodiment may comprise:

S401, query whether a hardware decoder corresponding to the encoding format information of the video to be played is contained in the predetermined hardware decoders in the pool of decoders;

If included, S402 is executed; otherwise S403 is executed;

S402, if the pool of decoders contains a predetermined hardware decoder corresponding to the encoding format information of the video to be played, acquire the hardware decoder corresponding to the encoding format information of the video to be played from the predetermined hardware decoders in the pool of decoders;

S403, if the pool of decoders does not contain a predetermined hardware decoder corresponding to the encoding format information of the video to be played, asynchronously create a hardware decoder corresponding to the encoding format information of the video to be played based on the encoding format information of the video to be played.

In this embodiment, if the pool of decoders does not contain a predetermined hardware decoder corresponding to the encoding format information of the video to be played, the hardware decoder corresponding to the encoding format information of the video to be played is asynchronously created, as described in the above embodiment, which ensures that the time to first frame can be reduced by means of asynchronous initialization of the hardware decoder in the case that the hardware decoder cannot be acquired from the pool of decoders.

Further, after the hardware decoder has finished decoding the obtained video to be played, the hardware decoder may likewise be re-added to the pool of decoders to expand the hardware decoder in the pool of decoders so as to facilitate subsequent videos to reuse the hardware decoder.

In another optional embodiment, as shown in FIG. 5, the asynchronous acquisition of a hardware decoder based on the encoding format information of the video to be played, as described at S202 of the above embodiment, comprises:

S501, determine whether the encoding format information of the video to be played is the same as the encoding format information of the previously played video;

If the same, S502 is executed; otherwise S503 is executed;

S502, if it is determined that the encoding format information of the video to be played is the same as the encoding format information of the previously played video, reuse the hardware decoder of the previously played video, wherein the hardware decoder of the previously played video has not been destroyed after completion of decoding of the previously played video;

S503, if it is determined that the encoding format information of the video to be played is different from the encoding format information of the previously played video, query whether the predetermined hardware decoders in the pool of decoders contain a hardware decoder corresponding to the encoding format information of the video to be played;

If included then S504 is executed; otherwise S505 is executed;

S504, if the pool of decoders contains a predetermined hardware decoder corresponding to the encoding format information of the video to be played, acquire the hardware decoder corresponding to the encoding format information of the video to be played from the predetermined hardware decoders in the pool of decoders;

S505, if the pool of decoders does not contain a predetermined hardware decoder corresponding to the encoding format information of the video to be played, asynchronously create a hardware decoder corresponding to the encoding format information of the video to be played based on the encoding format information of the video to be played.

In this embodiment, it is possible that the hardware decoder of the previously played video is not be released after the completion of decoding of the previously played video, that is, it is not added to the pool of decoders or destroyed. It can be determined whether the encoding format information of the current video to be played is the same as the encoding format information of the previously played video. If the encoding format information is the same, the hardware decoder of the previously played video may be reused directly. If the encoding format information of the video to be played is different from the encoding format information of the previous video that has been played, then the pool of decoders is quired to acquire a hardware decoder corresponding to the encoding format information of the video to be played. If the pool of decoders does not contain a predetermined hardware decoder corresponding to the encoding format information of the video to be played, then a hardware decoder corresponding to the encoding format information of the video to be played is asynchronously created based on the encoding format information of the video to be played. Optionally, if the hardware decoder of the previously played video is not reused, the hardware decoder may be added to the pool of decoders or destroyed. The above strategy ensures that different ways are used to asynchronously acquire hardware decoders in different situations, effectively reducing the time to first frame.

Corresponding to the video decoding method of the above embodiment, FIG. 6 shows a block diagram of an apparatus for video decoding as provided by an embodiment of the present disclosure. For ease of illustration, only the portions relevant to the embodiments of the present disclosure are shown. Referring to FIG. 6, the apparatus for video decoding 600 includes a communication unit 601, a processing unit 602, and a decoding unit 603.

The communication unit 601 is configured for obtaining playback address information of a video to be played, the playback address information carrying encoding format information of the video to be played.

The processing unit 602 is configured for obtaining the video to be played based on the playback address information, and for, in progress of obtaining the video to be played, asynchronously acquiring a hardware decoder based on the encoding format information of the video to be played.

The decoding unit 603 is configured for decoding the obtained video to be played with the hardware decoder.

In an embodiment of the present disclosure, the processing unit 602, in asynchronously acquiring a hardware decoder based on the encoding format information of the video to be played, is configured for:

asynchronously creating a hardware decoder corresponding to the encoding format information of the video to be played based on the encoding format information of the video to be played.

In an embodiment of the present disclosure, the processing unit 602, in acquiring a hardware decoder asynchronously based on the encoding format information of the video to be played, is configured for:

determining whether the encoding format information of the video to be played is the same as encoding format information of a previously played video;

if it is determined that the encoding format information of the video to be played is the same as the encoding format information of the previously played video, reusing a hardware decoder of the previously played video, wherein the hardware decoder of the previously played video has not been destroyed after decoding of the previously played video.

In an embodiment of the present disclosure, the processing unit 602 is further configured for:

if it is determined that the encoding format information of the video to be played is different from the encoding format information of the previously played video, asynchronously creating a hardware decoder corresponding to the encoding format information of the video to be played based on the encoding format information of the video to be played.

In an embodiment of the present disclosure, the processing unit 602, in acquiring a hardware decoder asynchronously based on the encoding format information of the video to be played, is configured for:

acquiring, based on the encoding format information of the video to be played, a hardware decoder corresponding to the encoding format information of the video to be played from predetermined hardware decoders in a pool of decoders.

In an embodiment of the present disclosure, the processing unit 602 is further configured for:

if the pool of decoders does not contain a predetermined hardware decoder corresponding to the encoding format information of the video to be played, asynchronously creating a hardware decoder corresponding to the encoding format information of the video to be played based on the encoding format information of the video to be played.

In an embodiment of the present disclosure, the processing unit 602 is further configured for:

upon completion of decoding of the obtained video to be played via the hardware decoder, adding the hardware decoder to the pool of decoders.

In an embodiment of the present disclosure, the processing unit 602, in asynchronously acquiring a hardware decoder based on the encoding format information of the video to be played, is configured for:

determining whether the encoding format information of the video to be played is the same as the encoding format information of the previously played video;

if it is determined that the encoding format information of the video to be played is the same as the encoding format information of the previously played video, reusing the hardware decoder of the previously played video, wherein the hardware decoder of the previously played video has not been destroyed after completion of the decoding of the previously played video;

if it is determined that the encoding format information of the video to be played is different from the encoding format information of the previously played video, acquiring, based on the encoding format information of the video to be played, a hardware decoder corresponding to the encoding format information of the video to be played from a pool of predetermined hardware decoders in the pool of decoders;

if the pool of decoders does not contain a predetermined hardware decoder corresponding to the encoding format information of the video to be played, asynchronously creating a hardware decoder corresponding to the encoding format information of the video to be played in accordance with the encoding format information of the video to be played.

In an embodiment of the present disclosure, the communication unit 601, in obtaining the playback address information of the video to be played, is configured for:

in response to a video switching instruction, obtaining the playback address information of the video to be played based on the video switching instruction.

The apparatus for video decoding provided in this embodiment may be used to perform the solutions of the above method embodiments, and the similar principles and technical effects will not be repeated herein.

FIG. 7 illustrates a schematic diagram of a structure of an electronic device 700 suitable for use in realizing an embodiment of the present disclosure, the electronic device 700 may be a terminal device or a server. The terminal device may include, but is not limited to, devices such as a cell phone, a laptop computer, a digital broadcast receiver, a Personal Digital Assistant (PDA), a Tablet PC (Portable Android Device (PAD)), a Portable Multimedia Player (Portable Media Player (PMP), in-vehicle terminal (e.g., in-vehicle navigation terminal), and the like mobile terminals, and fixed terminals such as digital TVs, desktop computers, and the like. The electronic device illustrated in FIG. 7 is merely an example and should not impose any limitation on the functions and scope of use of the embodiments of the present disclosure.

As shown in FIG. 7, the electronic device 700 may include a processing device (e.g., a central processor, a graphics processor, etc.) 701 that may perform various appropriate actions and processes based on a program stored in a Read-Only Memory (ROM) 702 or loaded from a storage device 708 into a Random Access Memory (RAM) 703 to perform various appropriate actions and processes. Also stored in the RAM 703 are various programs and data necessary for the operation of the electronic device 700. The processing device 701, the ROM 702, and the RAM 703 are connected to each other via the bus 704. An input/output (Input/Output, or I/O) interface 705 is also connected to the bus 704.

Typically, the following devices may be connected to the I/O interface 705: an input device 706 including, for example, a touch screen, a touch pad, a keyboard, a mouse, a camera, a microphone, an accelerometer, a gyroscope, and the like; an output device 707 including, for example, a liquid crystal display (Liquid Crystal Display (LCD)), a loudspeaker, a vibrator, and the like; a storage device 708 including, for example, a tape, a hard disk, and the like; and a communications device 708, a storage device 708; and a communication device 709. The communication device 709 may allow the electronic device 700 to communicate, in wireless or wired manner, with other devices to exchange data. While FIG. 7 illustrates electronic device 700 with various devices, it is to be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from a network via a communication device 709, or from a storage device 708, or from a ROM 702. When this computer program is executed by the processing device 701, it performs the above-described functions as defined in the methods of the embodiments of the present disclosure.

It is noted that the computer-readable medium described above in the present disclosure may be a computer-readable signal medium or a computer-readable storage medium or any combination of the above. The computer-readable storage medium may, for example, be—but is not limited to—a system, device, or apparatus or device of electricity, magnetism, light, electromagnetism, infrared, or semiconductors, or any combination of the above. More specific examples of computer-readable storage media may include, but are not limited to: electrical connections having one or more wires, portable computer disks, hard disks, RAM, ROM, Erasable Programmable Read-Only Memory (EPROM), flash memory, optical fiber, portable compact disk read-only memory (Compact Disc Read-Only Memory), optical fiber, optical fiber, optical fiber, optical fiber, optical fiber, optical fiber, optical fiber, optical fiber, optical fiber, optical fiber, optical fiber, and optical fiber. Read-Only Memory (Compact Disc Read-Only Memory, or CD-ROM), optical storage devices, magnetic storage devices, or any suitable combination of the foregoing. In the context of the present disclosure, a computer-readable storage medium may be any tangible medium that contains or stores a program that may be used by or in combination with an instruction execution system, device, or apparatus. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to, wire, fiber optic cable, radio frequency (RF), etc., or any suitable combination of the foregoing.

The above-described computer-readable medium may be contained in the above-described electronic device; or it may be present separately and not assembled into the electronic device.

The above-described computer-readable medium carries one or more programs that, when the above-described one or more programs are executed by the electronic device, cause the electronic device to perform the methods shown in the above-described embodiments.

Computer program code for performing the operations of the present disclosure may be written in one or more programming languages, or combinations thereof, including object-oriented programming languages—such as Java, Smalltalk, C++—and conventional procedural programming languages—such as "C" or similar programming languages. The program code may be executed entirely on the user's computer, partially on the user's computer, as a stand-alone software package, partially on the user's computer and partially on a remote computer, or entirely on a remote computer or server. In situations involving a remote computer, the remote computer may be connected to the user computer via any kind of network—including a Local Area Network (LAN) or a Wide Area Network (WAN)—or, alternatively, may be connected to an external computer, or, alternatively, may be connected to an external computer (e.g., utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It is also noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

The units described in the embodiments of the present disclosure may be implemented by way of software or by way of hardware. The name of the unit does not, in some cases, constitute a limitation of the unit itself, for example, the first acquisition unit may also be described as "a unit for acquiring at least two Internet Protocol addresses".

The functions described above herein may be performed, at least in part, by one or more hardware logic components. For example, non-limitingly, exemplary types of hardware logic components that may be used include Field-Programmable Gate Arrays (FPGAs), Application Specific Integrated Circuits (ASICs), Application Specific Standard Products (ASICs), and other hardware logic components. Product (Application Specific Standard Product, or ASSP), System On Chip (System On Chip, or SOC), Complex programmable logic device (CPLD), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include an electrical connection based on one or more wires, a portable computer disk, a hard disk, a RAM, a ROM, an EPROM, a flash memory, an optical fiber, a CD-ROM, an optical storage device, a magnetic storage device, or any suitable combination of the foregoing.

In a first aspect, according to one or more embodiments of the present disclosure, there is provided a video decoding method comprising:

obtaining playback address information of a video to be played, the playback address information carrying encoding format information of the video to be played;
    obtaining the video to be played based on the playback address information, and in progress of obtaining the video to be played, asynchronously acquiring a hardware decoder based on the encoding format information of the video to be played; and
    decoding the obtained video to be played with the hardware decoder.

According to one or more embodiments of the present disclosure, the asynchronously acquiring a hardware decoder based on the encoding format information of the video to be played comprises:

asynchronously creating a hardware decoder corresponding to the encoding format information of the video to be played based on the encoding format information of the video to be played.

According to one or more embodiments of the present disclosure, the asynchronously acquiring a hardware decoder based on the encoding format information of the video to be played comprising:

determining whether the encoding format information of the video to be played is the same as encoding format information of a previously played video;
    if it is determined that the encoding format information of the video to be played is the same as the encoding format information of the previously played video, reusing a hardware decoder of the previously played video, wherein the hardware decoder of the previously played video has not been destroyed after decoding of the previously played video.

According to one or more embodiments of the present disclosure, if it is determined that the encoding format information of the video to be played is different from the encoding format information of the previously played video, asynchronously creating a hardware decoder corresponding to the encoding format information of the video to be played based on the encoding format information of the video to be played.

According to one or more embodiments of the present disclosure, the asynchronously acquiring a hardware decoder based on the encoding format information of the video to be played comprises:

acquiring, based on the encoding format information of the video to be played, a hardware decoder corresponding to the encoding format information of the video to be played from predetermined hardware decoders in a pool of decoders.

According to one or more embodiments of the present disclosure, the method further comprises:

if the pool of decoders does not contain a predetermined hardware decoder corresponding to the encoding format information of the video to be played, asynchronously creating a hardware decoder corresponding to the encoding format information of the video to be played based on the encoding format information of the video to be played.

According to one or more embodiments of the present disclosure, the method further comprises:

upon completion of decoding of the obtained video to be played via the hardware decoder, adding the hardware decoder to the pool of decoders.

According to one or more embodiments of the present disclosure, the asynchronously acquiring a hardware decoder based on the encoding format information of the video to be played comprises:

determining whether the encoding format information of the video to be played is the same as the encoding format information of a previously played video;
    if it is determined that the encoding format information of the video to be played is the same as the encoding format information of the previously played video, reusing the hardware decoder of the previously played video, wherein the hardware decoder of the previously played video has not been destroyed after completion of decoding of the previously played video;
    if it is determined that the encoding format information of the video to be played is different from the encoding format information of the previously played video, acquiring, based on the encoding format information of the video to be played, a hardware decoder corresponding to the encoding format information of the video to be played from a pool of predetermined hardware decoders included in the pool of decoders;
    if the pool of decoders does not contain a predetermined hardware decoder corresponding to the encoding format information of the video to be played, asynchronously creating a hardware decoder corresponding to the encoding format information of the video to be played based on the encoding format information of the video to be played.

According to one or more embodiments of the present disclosure, the obtaining playback address information of the video to be played, comprising:

in response to the video switching instruction, playback address information of the video to be played is obtained based on the video switching instruction.

In a second aspect, according to one or more embodiments of the present disclosure, there is provided an apparatus for video decoding comprising:

a communication unit configured for obtaining playback address information of a video to be played, the playback address information carrying encoding format information of the video to be played;
    a processing unit configured for obtaining the video to be played based on the playback address information, and for, in progress of obtaining the video to be played, asynchronously acquiring a hardware decoder based on the encoding format information of the video to be played; and
    a decoding unit configured for decoding the obtained video to be played with the hardware decoder.

According to one or more embodiments of the present disclosure, the processing unit, in asynchronously acquiring a hardware decoder based on the encoding format information of the video to be played, is configured for:

asynchronously creating a hardware decoder corresponding to the encoding format information of the video to be played based on the encoding format information of the video to be played.

According to one or more embodiments of the present disclosure, the processing unit, in acquiring a hardware decoder asynchronously based on the encoding format information of the video to be played, is configured for:

determining whether the encoding format information of the video to be played is the same as encoding format information of a previously played video;

if it is determined that the encoding format information of the video to be played is the same as the encoding format information of the previously played video, reusing a hardware decoder of the previously played video, wherein the hardware decoder of the previously played video has not been destroyed after decoding of the previously played video.

According to one or more embodiments of the present disclosure, the processing unit is further configured for:

if it is determined that the encoding format information of the video to be played is different from the encoding format information of the previously played video, asynchronously creating a hardware decoder corresponding to the encoding format information of the video to be played based on the encoding format information of the video to be played.

According to one or more embodiments of the present disclosure, the processing unit, in acquiring a hardware decoder asynchronously based on the encoding format information of the video to be played, is configured for:

acquiring, based on the encoding format information of the video to be played, a hardware decoder corresponding to the encoding format information of the video to be played from predetermined hardware decoders in a pool of decoders.

According to one or more embodiments of the present disclosure, the processing unit is further configured for:

if the pool of decoders does not contain a predetermined hardware decoder corresponding to the encoding format information of the video to be played, asynchronously creating a hardware decoder corresponding to the encoding format information of the video to be played based on the encoding format information of the video to be played.

According to one or more embodiments of the present disclosure, the processing unit is further configured for:

upon completion of decoding of the obtained video to be played via the hardware decoder, adding the hardware decoder to the pool of decoders.

According to one or more embodiments of the present disclosure, the processing unit, in asynchronously acquiring a hardware decoder based on the encoding format information of the video to be played, is configured for:

determining whether the encoding format information of the video to be played is the same as the encoding format information of the previously played video;

if it is determined that the encoding format information of the video to be played is the same as the encoding format information of the previously played video, reusing the hardware decoder of the previously played video, wherein the hardware decoder of the previously played video has not been destroyed after completion of the decoding of the previously played video;

if it is determined that the encoding format information of the video to be played is different from the encoding format information of the previously played video, acquiring, based on the encoding format information of the video to be played, a hardware decoder corresponding to the encoding format information of the video to be played from a pool of predetermined hardware decoders in the pool of decoders;

if the pool of decoders does not contain a predetermined hardware decoder corresponding to the encoding format information of the video to be played, asynchronously creating a hardware decoder corresponding to the encoding format information of the video to be played in accordance with the encoding format information of the video to be played.

According to one or more embodiments of the present disclosure, the communication unit, in obtaining the playback address information of the video to be played, is configured for:

in response to a video switching instruction, obtaining the playback address information of the video to be played based on the video switching instruction.

In a third aspect, according to one or more embodiments of the present disclosure, it is provided an electronic device comprising at least one processor and a memory;

The memory stores computer execution instructions;

The at least one processor executing the computer executable instructions stored in the memory to cause the at least one processor to implement the method as described in the above first aspect and various possible designs thereof.

In a fourth aspect, according to one or more embodiments of the present disclosure, there is provided a computer-readable storage medium, the computer-readable storage medium having computer-executable instructions stored therein. The computer-executable instructions, when executed by a processor, cause the processor to implement the method as described in the above first aspect and various possible designs thereof.

In a fifth aspect, according to one or more embodiments of the present disclosure, it is provided a computer program product comprising computer-executable instructions that, when the processor executes the computer-executable instructions, implements a video decoding method as described in the above first aspect and various possible designs thereof.

In a sixth aspect, according to one or more embodiments of the present disclosure, it is provided a computer program, the computer program, when executed by a processor, implementing a video decoding method as described in the above first aspect and various possible designs thereof.

The foregoing description is merely an illustration of a preferred embodiment of the present disclosure and an illustration of the technical principles utilized. It should be understood by those skilled in the art that the scope of the disclosure in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above-mentioned features with technical features having similar functions disclosed in the present disclosure (but not limited to).

Furthermore, although the operations are depicted using a particular order, this should not be construed as requiring that the operations be performed in the particular order shown or in a sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter limited in the appended claims is not necessarily limited to the particular features or actions described above. Rather, the specific features and actions described above are merely exemplary forms of claim realization.

The invention claimed is:

1. A method of video decoding comprising:
   obtaining, prior to obtaining a video to be played, playback address information of the video to be played, the playback address information carrying encoding format information of the video to be played;
   obtaining the video to be played based on the playback address information,
   during the progress of obtaining the video to be played, asynchronously initializing a hardware decoder based on the encoding format information of the video to be played, the asynchronous initialization comprising selecting a hardware decoder for the encoding format based on the encoding format information carried in the playback address information; and
   decoding the obtained video to be played with the hardware decoder.

2. The method of claim 1, wherein the asynchronously initializing a hardware decoder based on the encoding format information of the video to be played comprises:
   asynchronously creating the selected hardware decoder corresponding to the encoding format information of the video to be played based on the encoding format information of the video to be played.

3. The method of claim 1, wherein the asynchronously initializing a hardware decoder based on the encoding format information of the video to be played comprising:
   determining whether the encoding format information of the video to be played is the same as encoding format information of a previously played video; and
   in accordance with that it is determined that the encoding format information of the video to be played is the same as the encoding format information of the previously played video, reusing a hardware decoder of the previously played video, wherein the hardware decoder of the previously played video has not been destroyed after decoding of the previously played video.

4. The method of claim 3, further comprising:
   in accordance with that it is determined that the encoding format information of the video to be played is different from the encoding format information of the previously played video, asynchronously creating the selected hardware decoder corresponding to the encoding format information of the video to be played based on the encoding format information of the video to be played.

5. The method of claim 3, further comprising:
   in accordance with that it is determined that the encoding format information of the video to be played is different from the encoding format information of the previously played video, selecting, based on the encoding format information of the video to be played, a hardware decoder corresponding to the encoding format information of the video to be played from predetermined hardware decoders in a pool of decoders;
   in accordance with that the pool of decoders does not contain a predetermined hardware decoder corresponding to the encoding format information of the video to be played, asynchronously creating a hardware decoder corresponding to the encoding format information of the video to be played based on the encoding format information of the video to be played.

6. The method of claim 1, wherein the asynchronously initializing a hardware decoder based on the encoding format information of the video to be played comprises:
   selecting, based on the encoding format information of the video to be played, a hardware decoder corresponding to the encoding format information of the video to be played from predetermined hardware decoders in a pool of decoders.

7. The method of claim 6, further comprising:
   in accordance with that the pool of decoders does not contain a predetermined hardware decoder corresponding to the encoding format information of the video to be played, asynchronously creating the selected hardware decoder corresponding to the encoding format information of the video to be played based on the encoding format information of the video to be played.

8. The method of claim 6, further comprising:
   upon completion of decoding of the obtained video to be played via the hardware decoder, adding the hardware decoder to the pool of decoders.

9. The method of claim 1, wherein the obtaining playback address information of the video to be played comprises:
   in response to a video switching instruction, obtaining the playback address information of the video to be played based on the video switching instruction.

10. An electronic device comprising: at least one processor; and
   a memory, the memory storing computer executable instructions, the at least one processor executing the computer executable instructions stored in the memory cause the at least one processor to perform acts comprising:
   obtaining, prior to obtaining a video to be played, playback address information of the video to be played, the playback address information carrying encoding format information of the video to be played;
   obtaining the video to be played based on the playback address information,
   during the progress of obtaining the video to be played, asynchronously initializing a hardware decoder based on the encoding format information of the video to be played, the asynchronous initialization comprising selecting a hardware decoder for the encoding format based on the encoding format information carried in the playback address information; and
   decoding the obtained video to be played with the hardware decoder.

11. The electronic device of claim 10, wherein the asynchronously initializing a hardware decoder based on the encoding format information of the video to be played comprises:
   asynchronously creating the selected hardware decoder corresponding to the encoding format information of the video to be played based on the encoding format information of the video to be played.

12. The electronic device of claim 11, wherein the acts further comprise:

in accordance with that it is determined that the encoding format information of the video to be played is different from the encoding format information of the previously played video, asynchronously creating the selected hardware decoder corresponding to the encoding format information of the video to be played based on the encoding format information of the video to be played.

13. The electronic device of claim 10, wherein the asynchronously initializing a hardware decoder based on the encoding format information of the video to be played comprising:

determining whether the encoding format information of the video to be played is the same as encoding format information of a previously played video;

in accordance with that it is determined that the encoding format information of the video to be played is the same as the encoding format information of the previously played video, reusing a hardware decoder of the previously played video, wherein the hardware decoder of the previously played video has not been destroyed after decoding of the previously played video.

14. The electronic device of claim 10, wherein the asynchronously initializing a hardware decoder based on the encoding format information of the video to be played comprises:

selecting, based on the encoding format information of the video to be played, a hardware decoder corresponding to the encoding format information of the video to be played from predetermined hardware decoders in a pool of decoders.

15. The electronic device of claim 14, wherein the acts further comprise:

in accordance with that the pool of decoders does not contain a predetermined hardware decoder corresponding to the encoding format information of the video to be played, asynchronously creating the selected hardware decoder corresponding to the encoding format information of the video to be played based on the encoding format information of the video to be played.

16. A non-transitory computer-readable storage medium storing computer-executable instructions which, when executed by a processor, causes the processor to perform acts comprising:

obtaining, prior to obtaining a video to be played, playback address information of the video to be played, the playback address information carrying encoding format information of the video to be played;

obtaining the video to be played based on the playback address information, during the progress of obtaining the video to be played, asynchronously initializing a hardware decoder based on the encoding format information of the video to be played, the asynchronous initialization comprising selecting a hardware decoder for the encoding format based on the encoding format information carried in the playback address information; and decoding the obtained video to be played with the hardware decoder.

17. The non-transitory computer-readable storage medium of claim 16, wherein the asynchronously initializing a hardware decoder based on the encoding format information of the video to be played comprises:

asynchronously creating the selected hardware decoder corresponding to the encoding format information of the video to be played based on the encoding format information of the video to be played.

18. The non-transitory computer-readable storage medium of claim 16, wherein the asynchronously initializing a hardware decoder based on the encoding format information of the video to be played comprising:

determining whether the encoding format information of the video to be played is the same as encoding format information of a previously played video;

in accordance with that it is determined that the encoding format information of the video to be played is the same as the encoding format information of the previously played video, reusing a hardware decoder of the previously played video, wherein the hardware decoder of the previously played video has not been destroyed after decoding of the previously played video.

19. The non-transitory computer-readable storage medium of claim 18, wherein the acts further comprise:

in accordance with that it is determined that the encoding format information of the video to be played is different from the encoding format information of the previously played video, asynchronously creating the selected hardware decoder corresponding to the encoding format information of the video to be played based on the encoding format information of the video to be played.

20. The non-transitory computer-readable storage medium of claim 16, wherein the asynchronously initializing a hardware decoder based on the encoding format information of the video to be played comprises:

selecting, based on the encoding format information of the video to be played, a hardware decoder corresponding to the encoding format information of the video to be played from predetermined hardware decoders in a pool of decoders.

* * * * *